Jan. 10, 1939.  A. LINDBERG  2,143,784
ANTISKID DEVICE FOR WHEEL TIRES
Filed July 26, 1938

Arvid Lindberg
Inventor

By: Henry C Parker
Attorney.

UNITED STATES PATENT OFFICE 2,143,784

ANTISKID DEVICE FOR WHEEL TIRES

Arvid Lindberg, Jorn, Sweden

Application July 26, 1938, Serial No. 221,399
In Sweden May 21, 1937

1 Claim. (Cl. 152—239)

The present invention relates to a protective separator to be inserted between a tire and anti-skid chains applied thereto which latter consist of peripheral chains and cross-chains fastened to said peripheral chains by means of hooks. The invention has for its object, inter alia, to bring about a simplification and improvement of hitherto used protective separators of this kind and is characterized by the fact that the protective separator has the shape of a flat piece forming a tangential extension of a sleeve adapted to accommodate one or more links of a peripheral chain, said sleeve having a lateral opening of such size that one of said hooks may easily be introduced and hooked-on to a link of the peripheral chain located in the sleeve.

The invention will be more closely described with reference to the accompanying drawing, wherein—

Figure 1:
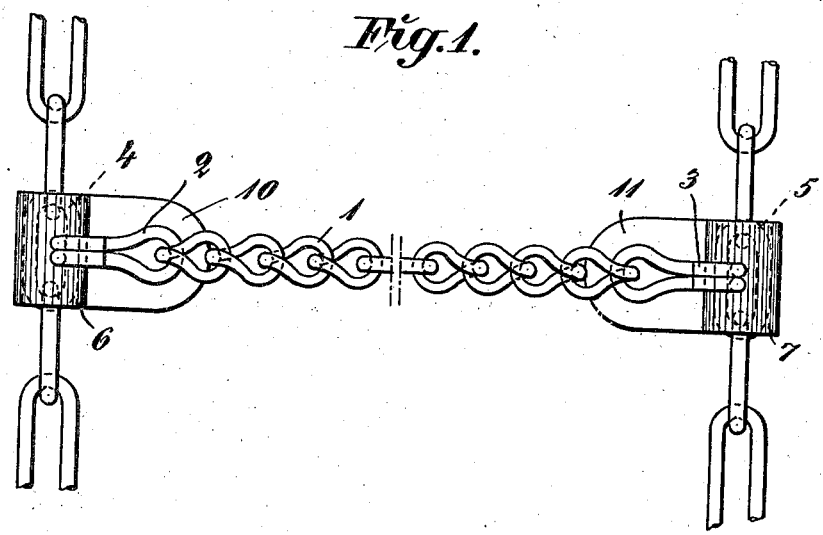
Figure 2:
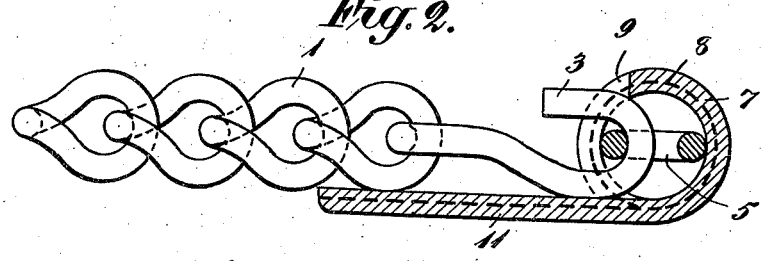
Figure 3:
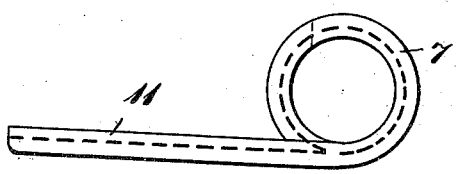
Figure 4:
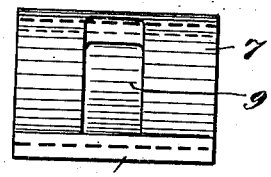
Figure 5:
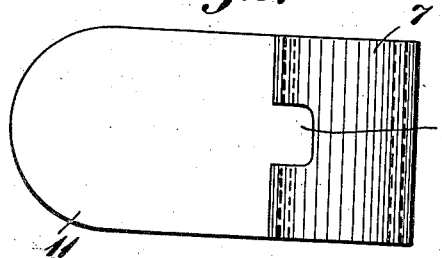

Figure 1 shows parts of the peripheral chains with a hooked-on cross-chain fitted with protective separators, Figure 2 is a cross-section on an enlarged scale through the point of union between a cross-chain and a peripheral chain, and Figures 3, 4 and 5 show the shape of the protective separator in three different projections.

The cross-chain 1 is in known manner provided at its ends with hooks 2, 3 which are hooked-on to opposing links 4, 5 of the peripheral chains. Said links are enclosed by sleeves 6, 7 made of rubber with or without canvas insertion 8, or of other flexible or elastic material. The sleeves are provided with laterally directed openings 9 and permitting the introduction of the hooks 2, 3 for the purpose of hooking them on to the links 4, 5. Preferably, the axial length of the opening 9 is not greater than that it just permits the hooks 2, 3 to be hooked-on under a certain friction. In similar manner, also the width of the opening, counted along the circumference of the sleeve, may be comparatively narrow relative to the hooks 2, 3. In this way the edges of the opening surround and retain the hook elastically in its hooked-on position.

At their side turned towards the tire, the sleeves 7 are provided with a flat piece 10, 11 extending in the direction of the cross-chain 1 and tangentially to the sleeve 6, 7, being integral therewith. The pieces 10, 11 may be made of the same material as the sleeves 6, 7, or of other flexible or elastic material adapted to the purpose. Suitably, they may simply be vulcanized to the sleeves, whereby the device will be simple and economical in manufacture.

It has been assumed in the example shown on the drawing that the width of the flat pieces 10, 11, reckoned right across the cross-chains, is equal to the corresponding length of the sleeves, but in some cases both a greater and a smaller width may be found suitable, without departing from the inventive idea. Further, the length of the flat pieces in the direction of the cross-chains may be greater or smaller, the principal thing being that the wear occurring in case of ordinary anti-skid chains at the points of union between peripheral chains and cross-chains is reduced or neutralized.

What is claimed is:

A protective separator to be inserted between a tire and anti-skid chains applied thereto which latter consist of peripheral chains and cross-chains hooked-on to said peripheral chains by means of hooks, said separator comprising a sleeve adapted to accommodate a part of one of said peripheral chains, a flat piece forming a tangential extension to and being integral with said sleeve, said sleeve having a lateral opening of such a size that one of said hooks may easily be introduced and hooked on to a link of the peripheral chain located in the sleeve.

ARVID LINDBERG.